US012064820B2

(12) United States Patent
Yu (10) Patent No.: US 12,064,820 B2
(45) Date of Patent: Aug. 20, 2024

(54) PROCESS FOR MILLING A KITCHEN SINK

(71) Applicant: Mila International Inc., Huntington Beach, CA (US)

(72) Inventor: Shujen Yu, Las Vegas, NV (US)

(73) Assignee: Mila International Inc., Huntington Beach, CA (US)

( * ) Notice: Subject to any disclaimer, the term of this patent is extended or adjusted under 35 U.S.C. 154(b) by 519 days.

(21) Appl. No.: 17/439,726

(22) PCT Filed: Feb. 15, 2019

(86) PCT No.: PCT/US2019/018320
§ 371 (c)(1),
(2) Date: Sep. 15, 2021

(87) PCT Pub. No.: WO2020/167321
PCT Pub. Date: Aug. 20, 2020

(65) Prior Publication Data
US 2022/0152712 A1    May 19, 2022

(51) Int. Cl.
*B23C 3/16*    (2006.01)

(52) U.S. Cl.
CPC ..................... *B23C 3/16* (2013.01)

(58) Field of Classification Search
CPC ......... B23C 3/16; B23C 2265/08; B23C 3/30; B21D 11/08; B21D 51/18; B23P 15/00; A47K 1/04; E03C 1/14; E03C 1/16; E03C 1/18; E03C 1/182; E03C 1/186; Y10T 409/303752; Y10T 403/303808; Y10T 409/304424
USPC ......................................... 409/131–132, 143
See application file for complete search history.

(56) References Cited

U.S. PATENT DOCUMENTS

| | | | |
|---|---|---|---|
| 2,350,119 A | 5/1944 | Kotcher | |
| 3,774,561 A * | 11/1973 | Herbold | B21D 22/26 72/349 |
| 5,088,181 A | 2/1992 | Jeppsson | |
| 6,718,788 B1 * | 4/2004 | Shuck | F25D 21/14 220/571 |
| 2010/0077547 A1 | 4/2010 | Tortorella et al. | |
| 2015/0128339 A1 * | 5/2015 | Warner | E03C 1/186 4/514 |

(Continued)

FOREIGN PATENT DOCUMENTS

| | | | |
|---|---|---|---|
| EP | 1710095 A1 * | 10/2006 | B41C 1/141 |
| WO | WO-2011114364 A1 | 9/2011 | |

OTHER PUBLICATIONS

CNC Router cutting aluminium—Test high speed, published by Phuc Nguyen on Jul. 28, 2017 on YouTube.com, https://www.youtube.com/watch?v=txCMvRF4Bm8 (Year: 2017).*

(Continued)

*Primary Examiner* — Sarang Afzali
*Assistant Examiner* — Darrell C Ford
(74) *Attorney, Agent, or Firm* — Harness, Dickey & Pierce, P.L.C.

(57) ABSTRACT

In an example, a method for milling a sink is disclosed. The method includes receiving a metal sheet, positioning the metal sheet in a receiving assembly for a milling machine, and scoring the metal sheet via a cutter of the milling machine. The metal sheet is scored along an axis corresponding to a bend of the sink. The method also includes manipulating the metal sheet to form the sink.

18 Claims, 5 Drawing Sheets

(56) References Cited

U.S. PATENT DOCUMENTS

2016/0263639 A1* 9/2016 Yoshida .............. B65D 5/242
2017/0326615 A1* 11/2017 Roy .................... A47K 3/40

OTHER PUBLICATIONS

How to Make Useful Steel Boxes—Simple Jig with No Folding Equipment Needed, published by Pask Makes on YouTube on Nov. 25, 2022, https://www.youtube.com/watch?v=yrb1Oh0aJM4 (Year: 2022).*
Examiner's web search history; Mar. 8, 2024 (Year: 2024).*
English machine translation of EP-1710095-A1 (Year: 2006).*
International Search Report and Written Opinion of the International Searching Authority issued in PCT/US2019/018320, mailed May 1, 2019; ISA/US.
International Preliminary Report on Patentability (Chapter I of the PCT) issued in PCT/US2019/018320, dated Aug. 10, 2021; IPEA/US.

* cited by examiner

PROCESS FOR MILLING A KITCHEN SINK

CROSS REFERENCE TO RELATED APPLICATIONS

This application is a U.S. National Phase Application under 35 U.S.C. 371 of International Application No. PCT/US2019/018320 filed on Feb. 15, 2019. The entire disclosure of the above application is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a process for forming a sink.

Sinks made from stainless steel provide excellent durability in comparison to some other materials. Stainless steel sinks can be used in harsh environments to resist damage. Additionally, stainless steel sinks can be used to compliment certain kitchen designs.

SUMMARY

In an example, a method for milling a sink is disclosed. The method includes receiving a metal sheet, positioning the metal sheet in a receiving assembly for a milling machine, and scoring the metal sheet via a cutter of the milling machine. The metal sheet is scored along an axis corresponding to a bend of the sink. The method also includes manipulating the metal sheet to form the sink.

In other features, the cutter scores a portion of the metal sheet along the axis so that a depth of the scored portion ranges from $1/10^{th}$ to $9/10^{th}$ of a depth of the metal sheet.

In other features, the cutter scores a portion of the metal sheet along the axis so that the depth of the scored portion is at least ½ the depth of the metal sheet In other features, the method includes pressing the metal sheet to form the sink via a pressing machine.

In other features, the method includes pressing the metal sheet to form a basin portion and a flange portion.

In other features, a width of the scored portion of the metal sheet is 2.3813 millimeters.

In other features, the metal sheet comprises at least one of stainless steel or titanium.

In an example, a method for milling a sink is disclosed. The method includes receiving a metal sheet, positioning the metal sheet in a receiving assembly for a milling machine, scoring the metal sheet via a cutter of the milling machine. The metal sheet is scored along an axis corresponding to a bend of the sink. The method also includes positioning the metal sheet in a receiving assembly of a pressing machine and pressing the metal sheet, via the pressing machine, to form the sink.

In other features, the cutter scores a portion of the metal sheet along the axis so that a depth of the scored portion ranges from $1/10$th to $9/10$th of a depth of the metal sheet.

In other features, the cutter scores a portion of the metal sheet along the axis so that the depth of the scored portion is at least ½ the depth of the metal sheet.

In other features, the method includes pressing the metal sheet to form a basin portion and a flange portion.

In other features, a width of the scored portion of the metal sheet is 2.3813 millimeters.

In other features, the metal sheet comprises at least one of stainless steel or titanium.

In an example, a method for milling a sink is disclosed. The method includes transitioning, via a controller, a cutter of a milling machine proximate to a first position of a metal sheet corresponding to a bend for a sink, causing the cutter to score the metal sheet along an axis passing through the first position to form a bend line, determining whether the metal sheet requires another score, and transitioning the cutter to a second position of the metal sheet corresponding to a second bend when the metal sheet requires another score where the second position is different from the first position.

In other features, the method includes causing the cutter to score the metal sheet along a second axis passing through the second position to form a second bend line.

In other features, the cutter scores a portion of the metal sheet along the axis so that a depth of the scored portion ranges from $1/10^{th}$ to $9/10^{th}$ of a depth of the metal sheet.

In other features, the cutter scores a portion of the metal sheet along the axis so that the depth of the scored portion is at least ½ the depth of the metal sheet.

In other features, the metal sheet comprises a metal sheet having substantially the same thickness.

In other features, a width of the scored portion of the metal sheet is 2.3813 millimeters.

In other features, the metal sheet comprises at least one of stainless steel or titanium.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Stainless steel sinks may be formed from a single sheet of stainless steel or titanium. The sheet can be manipulated to form one or more basin portions and one or more flange portions. However, since the sheet is typically of relative uniform thickness, perpendicular bends may be difficult to implement due to the strength of the stainless steel. Thus, the present disclosure is directed to scoring the sheet prior to manipulation to provide for sharper and/or tighter radius bends. For example, the process is used to reduce the radius at the bend point due to material thickness. Currently, sinks constructed from "thicker" metal sheets have a natural radius, after bending, of about 3.175 millimeters (0.125 inches). However, using techniques described in the present disclosure can reduce the radius, after bending, to about 1.5875 millimeters (0.0625 inches) or less using "thicker" metal sheets.

Figure 1:
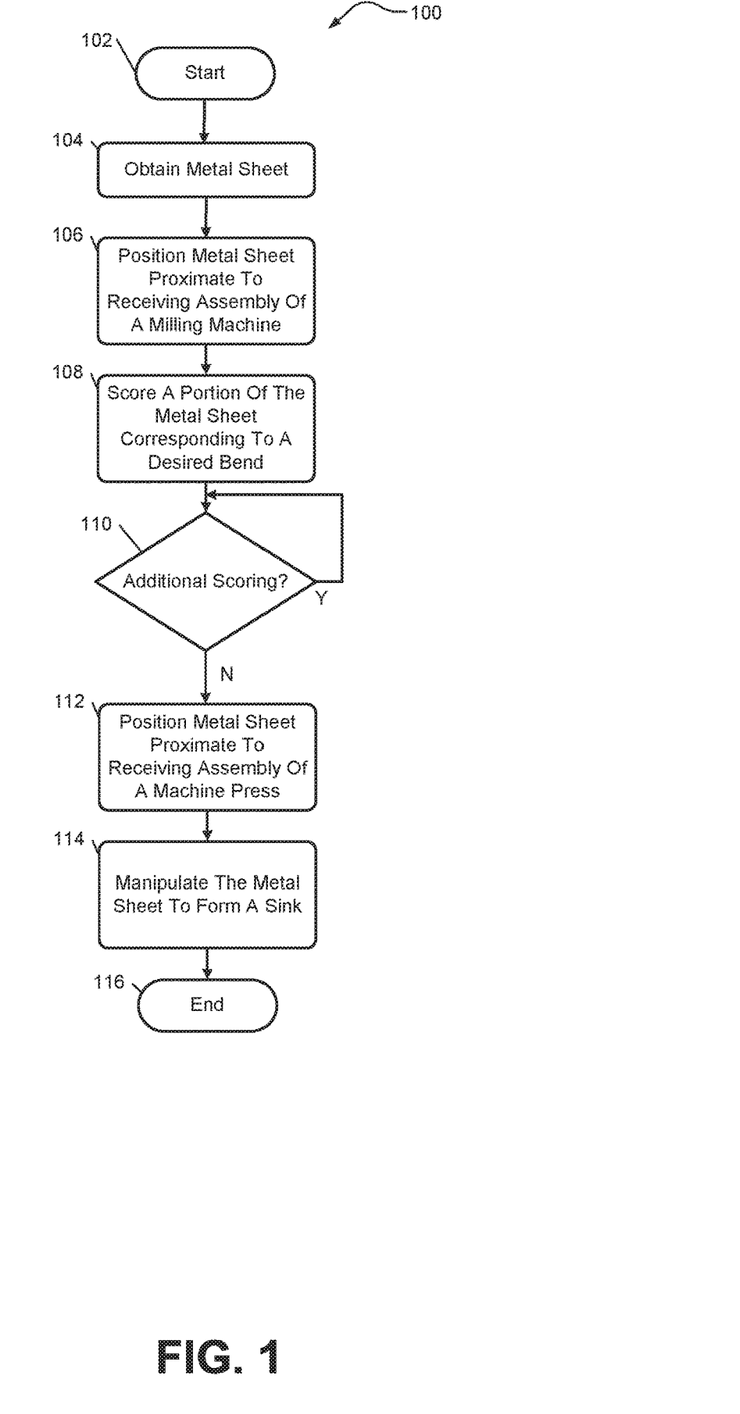
FIG. 1 is a flow diagram illustrating an example method for constructing a sink from a metal sheet in accordance with an example implementation of the present disclosure.

FIG. 1 illustrates a flow diagram of an example method 100 for forming a sink. The method 100 begins at 102. At 104, a metal sheet is obtained. For example, a single flat sheet of stainless steel having a substantially uniform thickness is obtained. At 106, the metal sheet is positioned proximate to a receiving assembly of a milling machine. The milling machine mills, or scores, a portion of the metal sheet at 108 that corresponds to a desired bend for the sink. At 110, a determination is made whether additional milling procedures are to be applied to the metal sheet. If additional milling procedures are to be applied to the metal sheet, the method 100 returns to 110. If no addition mill procedures are to be applied, the method 100 moves to 112.

At 112, the metal sheet is positioned in a receiving assembly of a machine press. At 114, the metal sheet is manipulated to form a kitchen sink. For example, the metal sheet may be manipulated to form a sink including one or more basin portions and one or more flange portions. The metal sheet can be manipulated, or pressed, about the scored portions of the metal sheet. At 116, the method 100 ends.

In one or more implementations, a cutter of the milling machine may be a V-shape cutter. However, it is understood that other cutters may be used without departing from the techniques described herein.

Figure 2A:
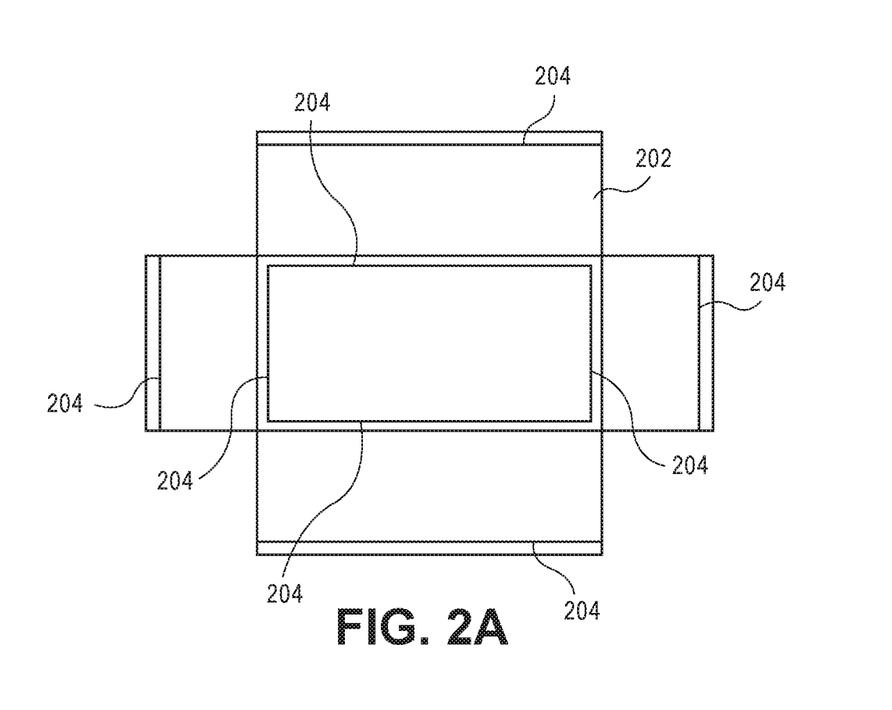
FIG. 2 is a plan view of a metal sheet having a first and a second scored portion in accordance with an example implementation of the present disclosure.
Figure 2B:
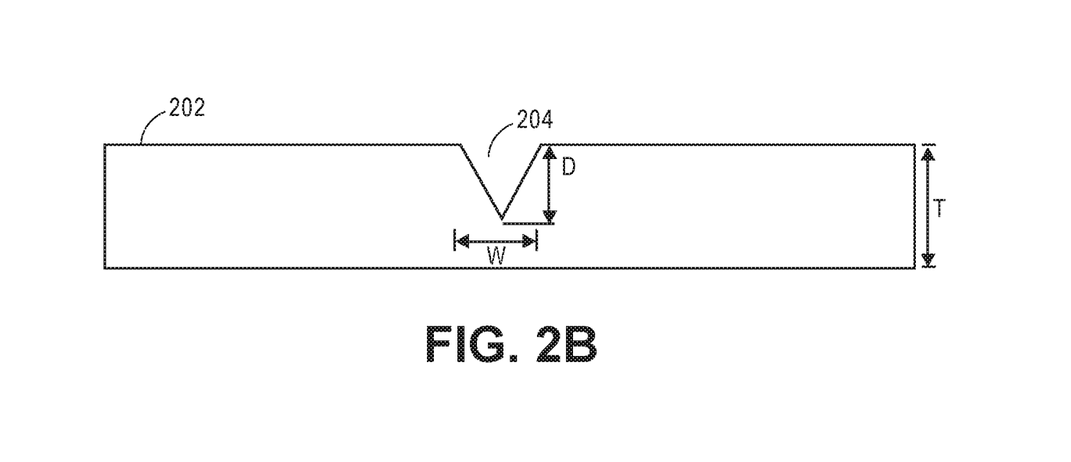

FIGS. 2A and 2B illustrate example metal sheet 202 that has been cut scored. The metal sheet 202 is scored corresponding to the thickness (T) of the metal sheet 202. In this example, the metal sheet 202 includes multiple scored portions 204. However, it is understood that a metal sheet 202 may include additional or fewer scores according to the design of the sink. The scored portions 204 correspond to the bend lines of the sink. The metal sheet 202 may have a thickness ranging between 26 gauge and 5 gauge. However, it is understood that this range is provided as example only.

In some examples, the width (W) of the scored portions of the metal sheet is 2.3813 millimeters (3/32"). The width (W) of the scored portions is selected to provide a specific bend within the sink. The depth (D) of the scored portion of the metal sheet can also vary with respect to the metal sheet. In an example implementation, the depth (D) of the score may range from $1/10^{th}$ the thickness (T) of the metal sheet to $9/10^{th}$ the thickness (T) of the metal sheet. In some implementations, the depth (D) of the score is ½ the thickness (T) of the metal sheet. In some specific examples, a metal sheet having a thickness (T) of 6.35 millimeters (¼") can have a score depth (D) that is ⅝ the thickness (T). In other specific examples, an 18 gauge metal sheet may have a score depth (D) that is ½ the thickness (T).

Figure 3:
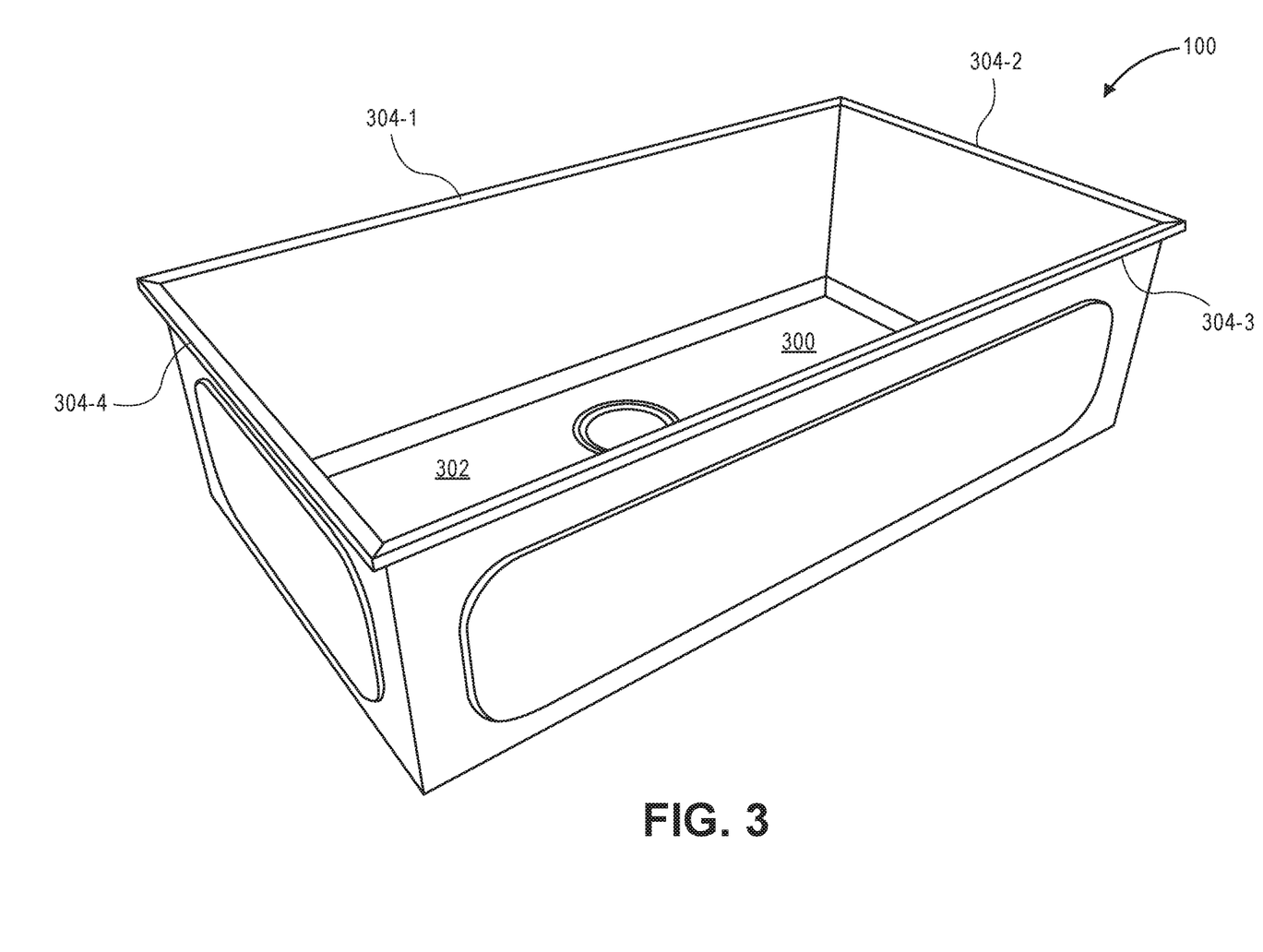
FIG. 3 is a cross-sectional view of the metal sheet shown in FIG. 2 in accordance with an example implementation of the present disclosure.

FIG. 3 illustrates an example sink 300 constructed from a single metal sheet. In an implementation, the sink 300 is constructed from a sheet of stainless steel. The sink 300 includes a basin portion 302 and flange portions 304-1 through 304-4. However, it is understood that other sink designs may be used without departing from the present disclosure.

Figure 4:
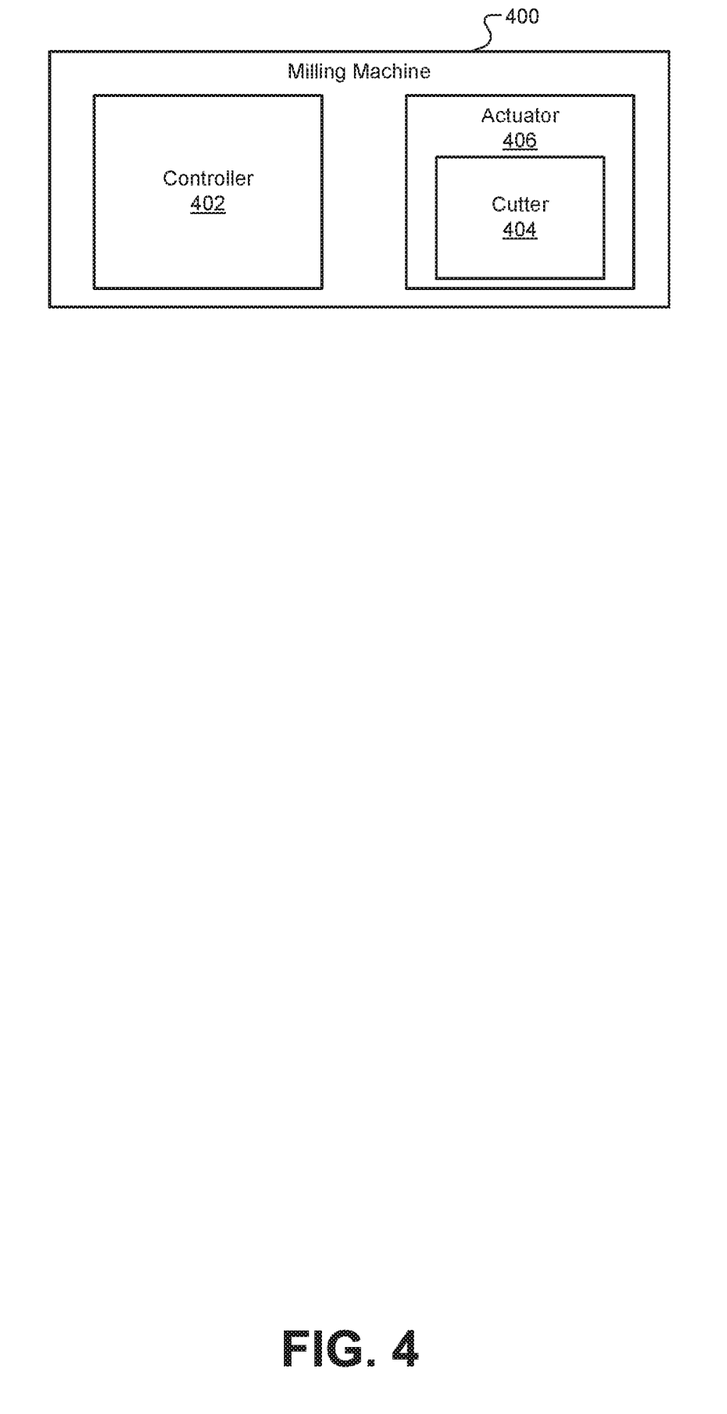
FIG. 4 is a block diagram of an example milling machine in accordance with an example implementation of the present disclosure.

FIG. 4 illustrates an example milling machine 400 that includes a controller 402 and a cutter 404. The controller 402 controls the cutter 404 to score the metal sheet, such as the metal sheet 202. For example, the controller 402 is programmed to score the metal sheet 202. The milling machine 400 may further include an actuator 406 that repositions the cutter 404 with respect to the received metal sheet.

Figure 5:
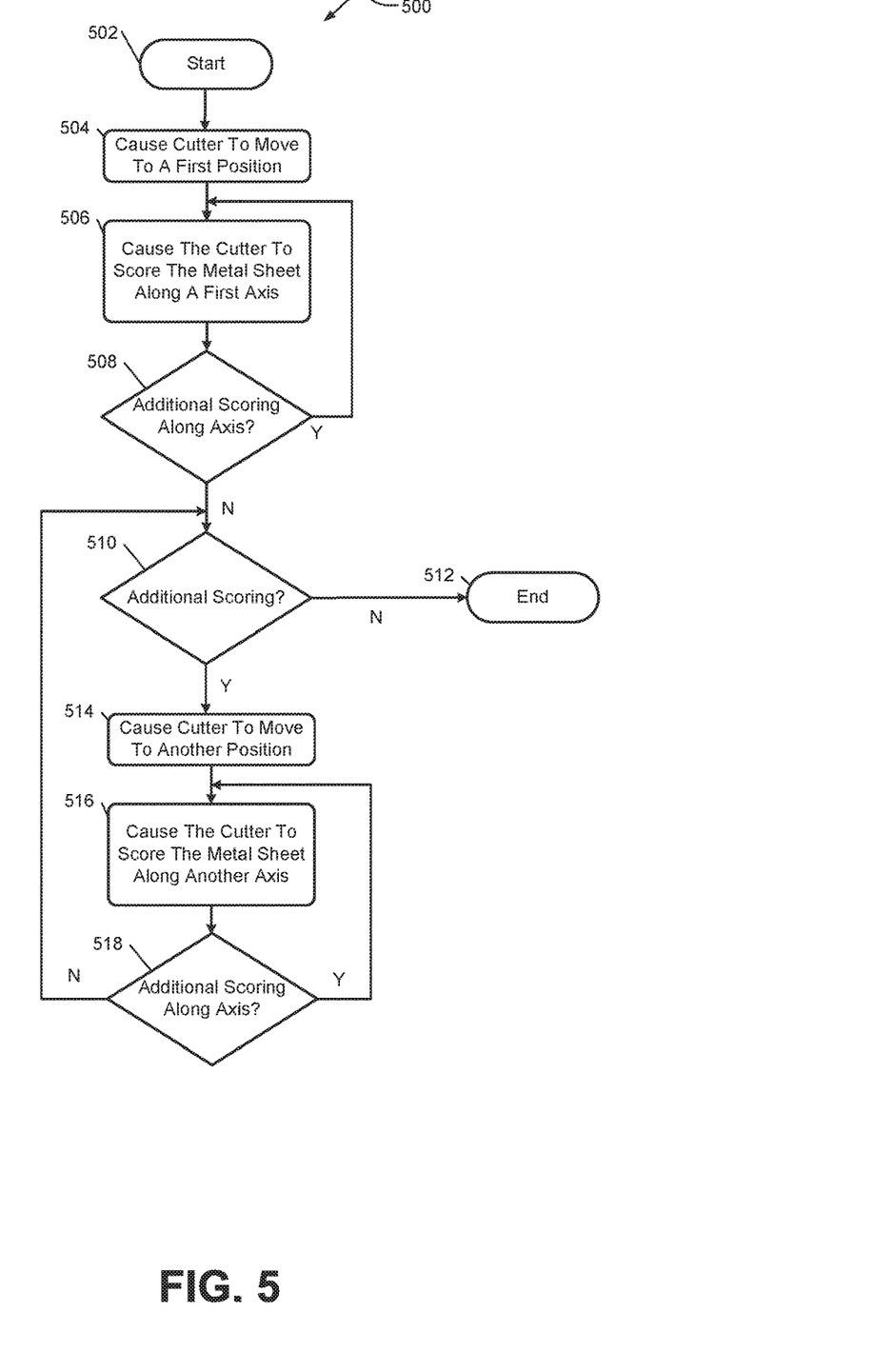
FIG. 5 is a flow diagram illustrating an example method for milling (e.g., scoring) a metal sheet along one or more axes that correspond to bend lines in accordance with an example implementation of the present disclosure.

FIG. 5 is illustrates an example method 500 for scoring the metal sheet using a milling machine, such as the milling machine 400. The method 500 begins at 502. At 504, the controller 402 causes the actuator 406 to transition the cutter 404 to a first position with respect to the metal sheet. At 506, the controller 402 causes the cutter 404 to score the metal sheet along a first axis passing through the first position. The axis corresponds to a desired bend line of the metal sheet. At 508, the controller 402 determines whether an additional score is required along the first axis. If another score along the first axis is required, the method 500 returns to 506. If no additional scoring is required along the axis, the controller 402 determines whether additional scores are required at 510. If no additional scores are required, the method 500 ends at 512. If additional scores are required, the controller 402 causes the actuator 406 to move the cutter 404 to another position at 514. At 516, the controller 402 causes the cutter to score the metal sheet along an axis passing through the position.

At 518, the controller 402 determines whether an additional score is required along the axis passing through the different position. If another score along the axis is required, the method 500 returns to 516. If no additional scoring along the axis is required, the method transitions to 510.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for milling a sink comprising:
   receiving a metal sheet;
   positioning the metal sheet in a receiving assembly for a milling machine;
   scoring the metal sheet via a cutter of the milling machine, wherein the metal sheet is scored along an axis corresponding to a bend of the sink; and
   manipulating the metal sheet to form the sink, wherein manipulating the metal sheet includes pressing the metal sheet to form the sink via a pressing machine.

2. The method as recited in claim 1, wherein the cutter scores a portion of the metal sheet along the axis so that a depth of the scored portion ranges from $\frac{1}{10}^{th}$ to $\frac{9}{10}^{th}$ of a depth of the metal sheet.

3. The method as recited in claim 2, wherein the cutter scores a portion of the metal sheet along the axis so that the depth of the scored portion is at least ½ the depth of the metal sheet.

4. The method as recited in claim 1, wherein pressing the metal sheet further comprising pressing the metal sheet to form a basin portion and a flange portion.

5. The method as recited in claim 1, wherein a width of the scored portion of the metal sheet is 2.3813 millimeters.

6. The method as recited in claim 1, wherein the metal sheet comprises at least one of stainless steel and titanium.

7. A method for milling a sink comprising:
   receiving a metal sheet;

positioning the metal sheet in a receiving assembly for a milling machine;

scoring the metal sheet via a cutter of the milling machine, wherein the metal sheet is scored along an axis corresponding to a bend of the sink;

positioning the metal sheet in a receiving assembly of a pressing machine; and pressing the metal sheet, via the pressing machine, to form the sink.

8. The method as recited in claim 7, wherein the cutter scores a portion of the metal sheet along the axis so that a depth of the scored portion ranges from $1/10^{th}$ to $9/10^{th}$ of a depth of the metal sheet.

9. The method as recited in claim 8, wherein the cutter scores a portion of the metal sheet along the axis so that the depth of the scored portion is at least ½ the depth of the metal sheet.

10. The method as recited in claim 7, wherein pressing the metal sheet further comprising pressing the metal sheet to form a basin portion and a flange portion.

11. The method as recited in claim 7, wherein a width of the scored portion of the metal sheet is 2.3813 millimeters.

12. The method as recited in claim 7, wherein the metal sheet comprises at least one of stainless steel and titanium.

13. A method for milling a sink comprising:
(a) transitioning, via a controller, a cutter of a milling machine proximate to a predetermined position of a metal sheet corresponding to a bend for a sink;
(b) causing the cutter to score the metal sheet along an axis passing through the predetermined position to form a bend line;
(c) determining whether the sheet requires another score;
(d) transitioning the cutter to a subsequent position of the metal sheet corresponding to a further bend line when the metal sheet requires another score, wherein the subsequent position is different from prior score positions;
(e) causing the cutter to score the metal sheet along the further bend line;
(f) repeating steps (c)-(e) until all bend lines have been scored; and
(g) once all bend lines have been scored, pressing the metal sheet via the pressing machine, to form the sink.

14. The method as recited in claim 13, wherein the cutter scores a portion of the metal sheet along the axis so that a depth of each score ranges from $1/10^{th}$ to $9/10^{th}$ of a depth of the metal sheet.

15. The method as recited in claim 13, wherein the cutter scores a portion of the metal sheet along the axis so that a depth of each score is at least ½ the depth of the metal sheet.

16. The method as recited in claim 13, wherein the metal sheet comprises a metal sheet having a constant thickness.

17. The method as recited in claim 13, wherein a width of the scored portion of the metal sheet is 2.3813 millimeters.

18. The method as recited in claim 13, wherein the metal sheet comprises at least one of stainless steel and titanium.

\* \* \* \* \*